US006998970B2

(12) United States Patent
Conte

(10) Patent No.: US 6,998,970 B2
(45) Date of Patent: Feb. 14, 2006

(54) TURN SIGNAL ASSEMBLY

(75) Inventor: Bruno Conte, Redondo Beach, CA (US)

(73) Assignee: Honda Motor Company, Ltd., Tokyo (JP)

( * ) Notice: Subject to any disclaimer, the term of this patent is extended or adjusted under 35 U.S.C. 154(b) by 122 days.

(21) Appl. No.: 10/819,762

(22) Filed: Apr. 7, 2004

(65) Prior Publication Data

US 2005/0168332 A1   Aug. 4, 2005

Related U.S. Application Data

(60) Provisional application No. 60/541,489, filed on Feb. 3, 2004.

(51) Int. Cl.
*B62J 3/00*   (2006.01)
(52) U.S. Cl. .................. 340/432; 340/465; 340/468; 340/475
(58) Field of Classification Search ............... 340/427, 340/432, 465, 468, 472, 475, 479, 332
See application file for complete search history.

(56) References Cited

U.S. PATENT DOCUMENTS

| | | | |
|---|---|---|---|
| 1,542,718 A | 6/1925 | Pemberton et al. | |
| 2,248,460 A | 7/1941 | Kraeft | |
| 4,024,388 A | 5/1977 | Skoff | |
| 4,461,508 A | 7/1984 | Ogishima | |
| 4,479,699 A | 10/1984 | Bolte | |
| 4,537,273 A * | 8/1985 | Funabashi | 180/229 |
| 4,686,656 A | 8/1987 | Morishima | |
| 4,868,720 A | 9/1989 | Miyauchi et al. | |
| 5,634,706 A | 6/1997 | Barry | |
| 5,799,124 A | 8/1998 | Zorn et al. | |
| 5,964,312 A | 10/1999 | Maldonado | |
| 6,152,585 A | 11/2000 | Barry | |
| 6,276,482 B1 | 8/2001 | Moriya et al. | |
| 6,398,393 B1 | 6/2002 | Perse | |
| 6,464,379 B1 | 10/2002 | McKenna | |
| D476,924 S | 7/2003 | Stahel et al. | |
| 6,592,242 B1 | 7/2003 | Scaccia | |
| 6,595,666 B1 | 7/2003 | Exilien | |
| 2003/0142501 A1 | 7/2003 | Exilien | |
| 2004/0231908 A1 * | 11/2004 | Michisaka et al. | 180/312 |
| 2005/0006169 A1 * | 1/2005 | Michisaka et al. | 180/312 |
| 2005/0173406 A1 * | 8/2005 | Kurumagawa et al. | 219/482 |

* cited by examiner

*Primary Examiner*—Daryl C Pope
(74) *Attorney, Agent, or Firm*—Dinsmore & Shohl LLP

(57) ABSTRACT

A turn signal assembly for a vehicle includes a housing adapted for association with a radiator of the vehicle. A power connection is associated with the housing and is adapted to receive power. A light source is associated with the housing and is coupled with the power connection. The light source is operative to selectively provide illumination as a turn signal indication. Motorcycles including an exemplary turn signal assembly are also provided.

31 Claims, 5 Drawing Sheets

TURN SIGNAL ASSEMBLY

RELATED APPLICATION

The present application claims priority of U.S. Provisional Application Ser. No. 60/541,489 filed Feb. 3, 2004 and hereby incorporates the same Provisional Application by reference.

TECHNICAL FIELD

The present invention relates to a turn signal assembly, and more particularly to a turn signal assembly for use with a motorcycle.

BACKGROUND OF THE INVENTION

Conventional vehicular turn signal systems often involve at least two sets of left and right directional turn signals. The first set is often disposed near the front of a vehicle, and the second set is often disposed near the rear of the vehicle. Such turn signals are often required of vehicles that are driven upon public motorways, and can be quite effective in providing turn, marker, and hazard indications to drivers of other vehicles.

Despite the importance of turn signals, their incorporation into certain vehicles has proven to detract from the associated vehicle's intended functionality, durability and/or appearance. For example, a conventional off-road motorcycle might not include a windshield or a handlebar fairing for which to associate front turn signals. Accordingly, if front turn signals are to be associated with such a motorcycle, they must often be supported (e.g., hung with fasteners) from either the handlebars, the front fork assembly, or the head tube of the motorcycle. However, supporting turn signals in this manner exposes them to a significant risk of breakage such as when the motorcycle falls over or is exposed to tree limbs or the like. Furthermore, such turn signals typically detract from the desired rugged appearance of such an off-road motorcycle. As another example, many conventional turn signals diminish the overall sleek appearance and aerodynamics of associated high performance road-type motorcycles. Accordingly, there is a need for a turn signal assembly that can be associated with a vehicle such as a motorcycle, that effectively provides signals to other drivers, but that does not significantly interfere with the functionality, durability or visual appeal of that vehicle.

SUMMARY OF THE INVENTION

In accordance with the purposes of the present invention defined herein, a turn signal assembly is provided for association with a vehicle such as a motorcycle. The turn signal assembly effectively provides signals to other drivers, but does not significantly interfere with the functionality, durability or visual appeal of that vehicle.

In accordance with one exemplary embodiment of the present invention, a motorcycle is provided having a frame and a front wheel that is connected to the frame by a front fork. A radiator is disposed behind at least one of the front fork and the front wheel. The radiator has a left side and a right side. A first turn signal assembly includes a first housing portion that is attached to the radiator adjacent to the left side of the radiator. The first housing portion covers at least a portion of the left side of the radiator. A first power connection is associated with the first housing portion and is adapted to receive electrical power. A first light source is associated with the first housing portion and is coupled with the first power connection. The first light source is operative to convert the electrical power into illumination for providing a left turn signal indication. The first light source includes at least one of a light emitting diode and an incandescent light bulb. The motorcycle also includes a second turn signal assembly. The second turn signal assembly includes a second housing portion that is attached to the radiator adjacent to the right side of the radiator. The second housing portion covers at least a portion of the right side of the radiator. A second power connection is associated with the second housing portion and is adapted to receive electrical power. A second light source is associated with the second housing portion and is coupled with the second power connection. The second light source is operative to convert the electrical power into illumination for providing a right turn signal indication. The second light source includes at least one of a light emitting diode and an incandescent light bulb.

In accordance with another exemplary embodiment of the present invention, a turn signal assembly for a motorcycle is provided. The turn signal assembly includes a housing adapted to be supported by a radiator of a motorcycle. A power connection is associated with the housing and is adapted to receive power. A light source is also associated with the housing and is coupled with the power connection. The light source is operative to selectively provide illumination as a turn signal indication.

In accordance with yet another exemplary embodiment of the present invention, the housing is adapted to be directly supported by a radiator of a motorcycle.

In accordance with still another exemplary embodiment of the present invention, the housing is attached to a radiator of a motorcycle.

In accordance with another exemplary embodiment of the present invention, the housing is adapted to be indirectly supported by a radiator of a motorcycle.

In accordance with still another exemplary embodiment of the present invention, the housing is attached to a cowl that at least partially surrounds a radiator of a motorcycle.

In accordance with yet another exemplary embodiment of the present invention, the housing is attached to a scoop that at least partially surrounds a radiator of a motorcycle.

In accordance with another exemplary embodiment of the present invention, the housing provides a scoop that at least partially surrounds a radiator of a motorcycle.

In accordance with another exemplary embodiment of the present invention, the housing provides a cowl that that at least partially surrounds a radiator of a motorcycle.

In accordance with yet another exemplary embodiment of the present invention, the housing includes a mounting base for the light source.

In accordance with yet another exemplary embodiment of the present invention, the turn signal assembly is adapted to provide one of a pair of front turn signals for a motorcycle.

In accordance with still another exemplary embodiment of the present invention, the turn signal assembly further includes at least one optic that is operative to manipulate the illumination from the light source.

In accordance with yet another exemplary embodiment of the present invention, the at least one optic includes at least one lens.

In accordance with another exemplary embodiment of the present invention, the at least one lens includes a textured surface.

In accordance with yet another exemplary embodiment of the present invention, the at least one lens is colored.

In accordance with still another exemplary embodiment of the present invention, the at least one lens is amber-colored.

In accordance with still another exemplary embodiment of the present invention, the at least one optic includes at least one reflective surface.

In accordance with yet another exemplary embodiment of the present invention, the light source includes at least one incandescent lamp.

In accordance with another exemplary embodiment of the present invention, the light source includes at least one LED.

In accordance with still another exemplary embodiment of the present invention, the light source includes a plurality of LEDs.

In accordance with yet another exemplary embodiment of the present invention, the power connection and the light source include an optical fiber.

In accordance with yet another exemplary embodiment of the present invention, a motorcycle is provided that includes a frame and a front wheel connected to the frame by a front fork. A radiator is disposed behind at least one of the front fork and the front wheel. A first turn signal assembly is associated with the radiator and includes a first housing portion adapted to be supported relative to the frame in proximity to the radiator. A first power connection is associated with the first housing portion and is adapted to receive power. A first light source is associated with the first housing portion and is coupled with the first power connection. The first light source is operative to selectively provide illumination as a turn signal indication.

In accordance with still another exemplary embodiment of the present invention, the first housing portion is adapted to be directly supported by the radiator.

In accordance with another exemplary embodiment of the present invention, the first housing portion is attached to the radiator.

In accordance with another exemplary embodiment of the present invention, the first housing portion is adapted to be indirectly supported by the radiator.

In accordance with yet another exemplary embodiment of the present invention, the first housing portion is attached to a cowl that at least partially surrounds the radiator.

In accordance with still another exemplary embodiment of the present invention, the first housing portion is attached to a scoop that at least partially surrounds the radiator.

In accordance with still another exemplary embodiment of the present invention, the first housing portion provides a scoop that at least partially surrounds the radiator.

In accordance with yet another exemplary embodiment of the present invention, the first housing portion provides a cowl that that at least partially surrounds the radiator.

In accordance with another exemplary embodiment of the present invention, the first light source includes an incandescent lamp.

In accordance with still another exemplary embodiment of the present invention, the first light source includes an LED.

In accordance with another exemplary embodiment of the present invention, the first turn signal assembly is adapted to provide one of a pair of front turn signals.

In accordance with yet another exemplary embodiment of the present invention, the motorcycle further includes a second turn signal assembly that is adapted to provide the other of the pair of front turn signals.

In accordance with still another exemplary embodiment of the present invention, the second turn signal assembly includes a second housing portion that is adapted to be supported relative to the frame in proximity to the radiator. A second power connection is associated with the second housing portion and is adapted to receive power. A second light source is associated with the second housing portion and is coupled with the second power connection. The second light source is operative to selectively provide illumination as a turn signal indication.

In accordance with yet another exemplary embodiment of the present invention, the first housing portion and the second housing portion are both integrally provided by the same housing.

In accordance with yet another exemplary embodiment of the present invention, the first housing portion and the second housing portion are provided by separate and distinct housings.

In accordance with yet another exemplary embodiment of the present invention, a turn signal assembly for a vehicle is provided that includes a housing adapted for association with a radiator of a vehicle. A power connection is associated with the housing and is adapted to receive electrical power. A light source is associated with the housing and is coupled with the power connection. The light source is operative to convert the electrical power into illumination for providing a turn signal indication. The light source includes at least one of a light emitting diode and an incandescent light bulb.

A turn signal assembly as described herein is advantageous as providing a turn signal assembly for a vehicle such as a motorcycle. The turn signal assembly effectively provides signals to other drivers, but does not significantly interfere with the functionality, durability or visual appeal of that vehicle. Additional aspects, advantages, and novel features of the invention will be set forth in part in the description that follows, and in part will become apparent to those skilled in the art upon examination of the following, or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
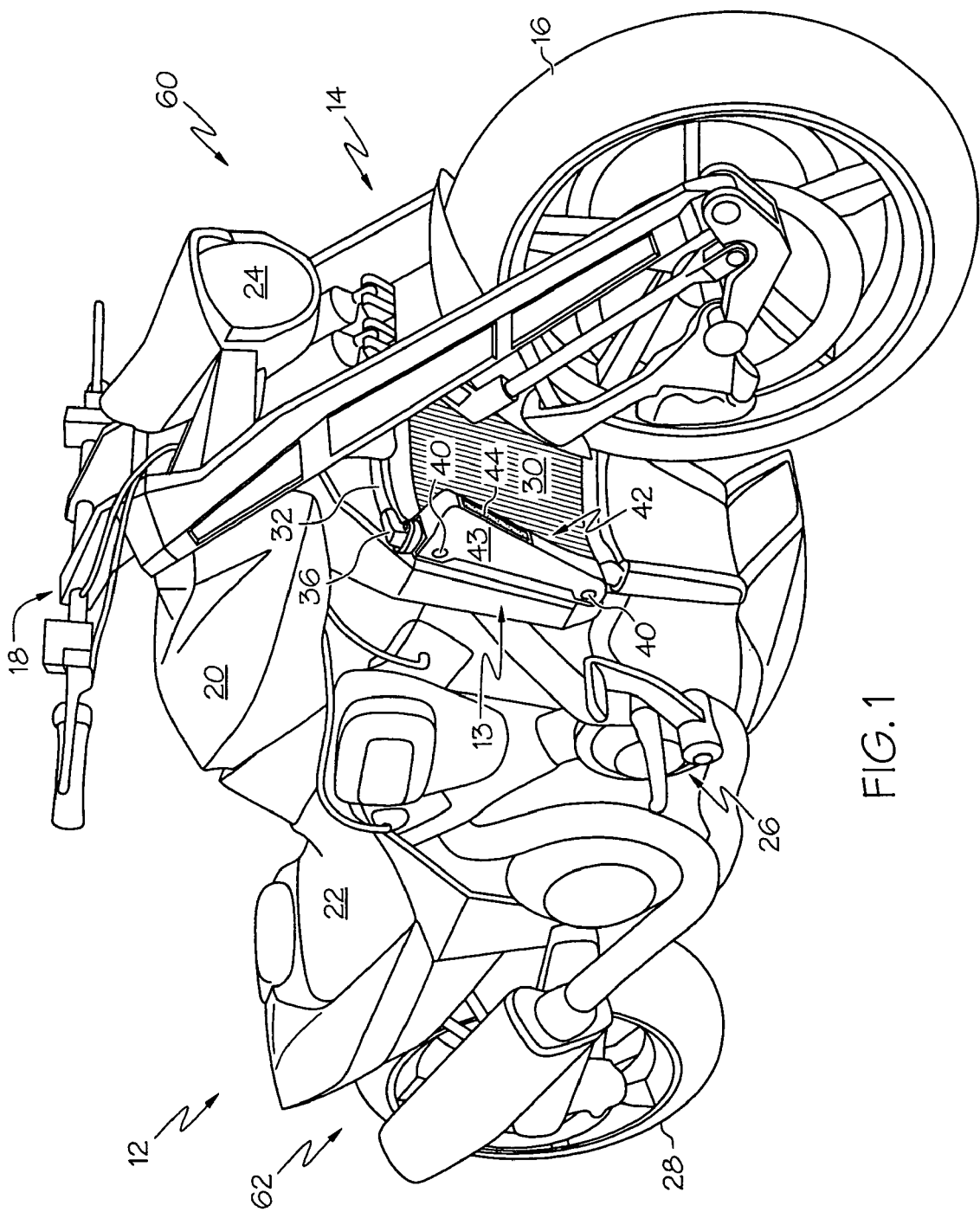
FIG. 1 is a front perspective view of a motorcycle having a turn signal assembly in accordance with one exemplary embodiment of the present invention.

Exemplary embodiments of the invention and its operation are hereinafter described in detail in connection with the views and examples of FIGS. 1–8, wherein like numbers indicate the same or corresponding elements throughout the views. As shown in FIG. 1, a motorcycle 12 can include a frame 13 that can operatively interface each of a rear wheel 28 and a front wheel 16. The rear wheel 28 can interface the frame 13 of the motorcycle 12 near a rearward end 62 of the motorcycle 12. The front wheel 16 can be supported by a front fork assembly 14 that is associated with the frame 13 near a forward end 60 of the motorcycle 12. Handlebars 18 can be associated with the front fork assembly 14 and can facilitate steering of the motorcycle 12 by an operator sitting upon a seat 22 of the motorcycle 12. A headlight 24 can be associated with the handlebars 18 and/or the front fork assembly 14 and can be configured to illuminate the roadway ahead of the motorcycle 12. The motorcycle 12 is also shown to include a gas tank 20 disposed between the seat 22 and the handlebars 18. Below the gas tank 20 and the seat 22 resides an engine 26 for powering the motorcycle 12.

Figure 2:
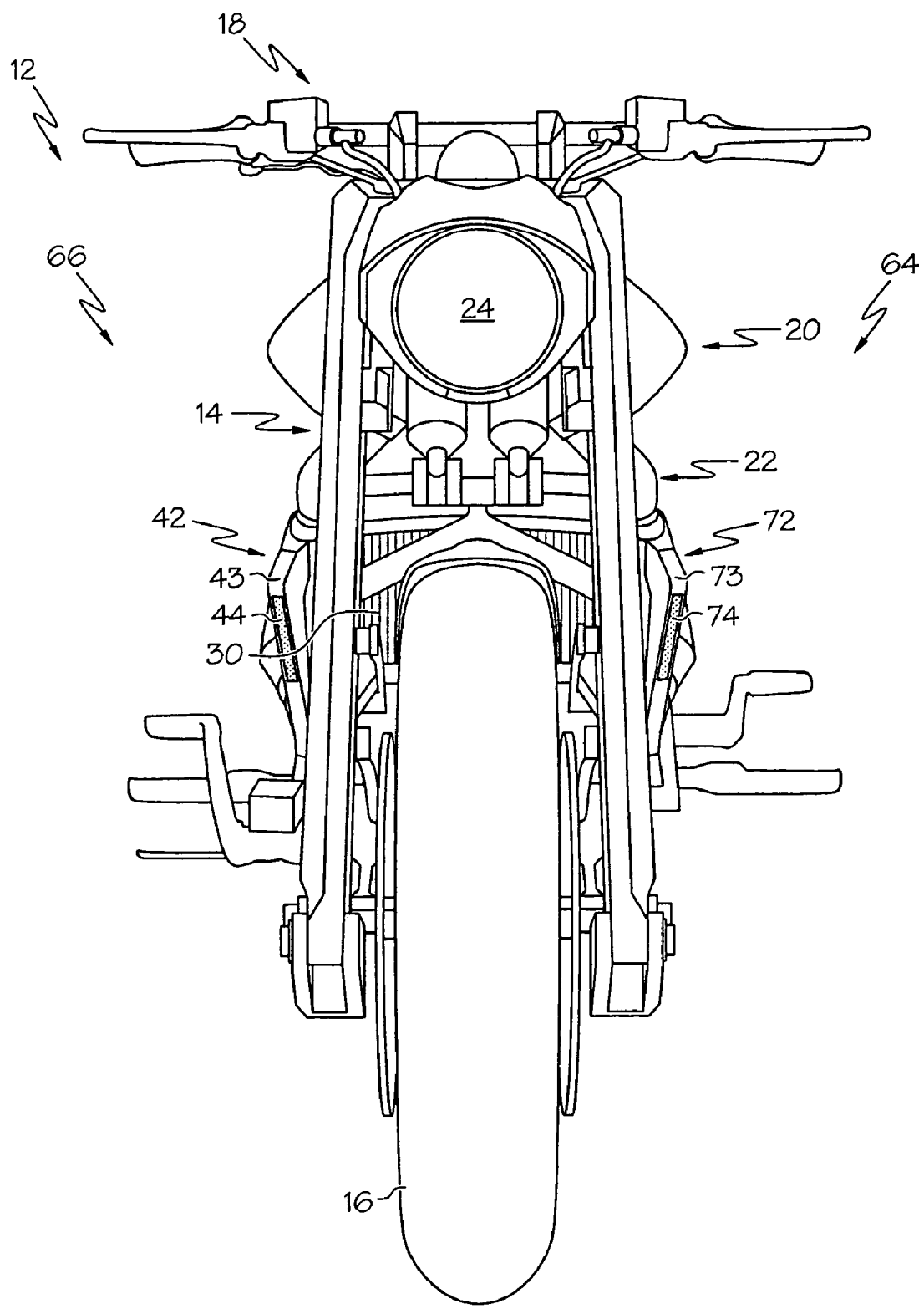
FIG. 2 is a front plan view depicting the motorcycle of FIG. 1.
Figure 3:
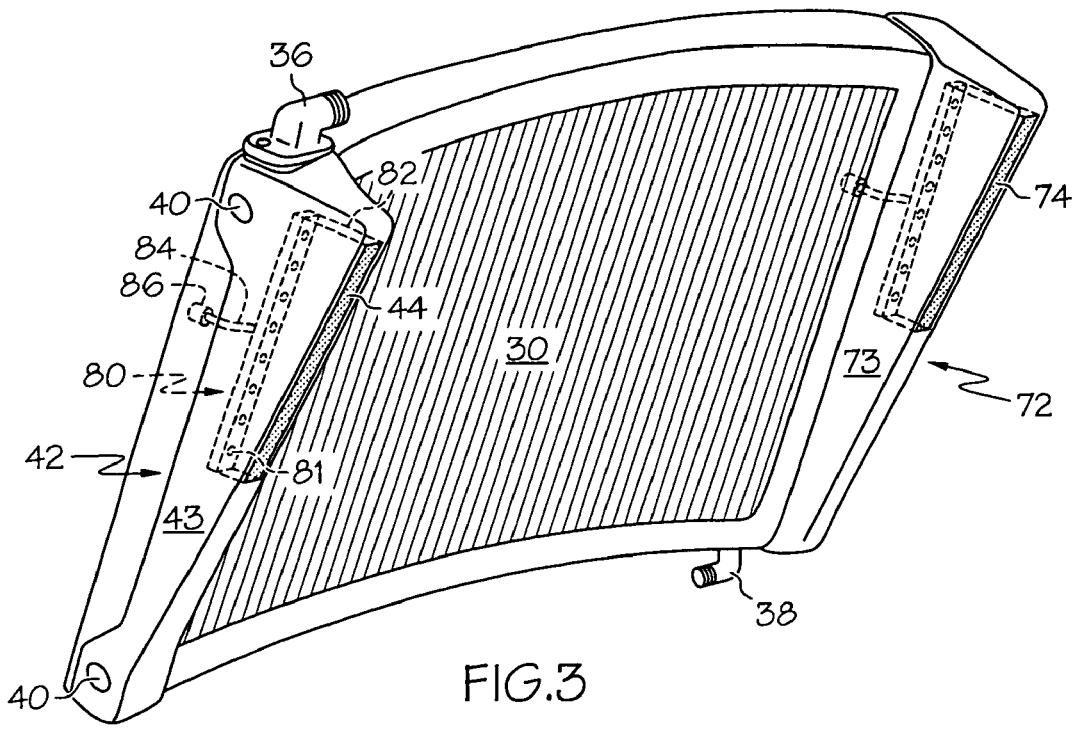
FIG. 3 is an enlarged front perspective view depicting the radiator and associated turn signal assemblies of the motorcycle of FIGS. 1–2.

A radiator 30 is shown to be associated with the motorcycle 12 behind the front wheel 16 and behind the front fork assembly 14. This radiator 30 is also shown as being disposed below the handlebars 18, below the gas tank 20 and below the headlight 24. Although the radiator 30 is depicted in FIGS. 1–3 as being generally rectangular in shape and being generally curved, it should be appreciated that a radiator in accordance with the present invention can assume virtually any size and/or shape, providing that the size and shape are suitable for association with the intended vehicle and provided that such a configuration enables the radiator to adequately cool the intended vehicular fluid. Such fluids might include engine oil, water, antifreeze, freon, brake fluid, power steering fluid, and/or any of a variety of other fluids or combinations thereof.

In order to facilitate the radiator's receipt of hot fluid and its release of cooled fluid, the radiator 30 can be provided with line fittings 36 and 38 (or other suitable connectors such as threaded apertures, tubing, etc.) that are coupled with the fluid passageway that is integrally provided within the radiator 30. These line fittings 36 and 38 can be configured for attachment to respective coolant lines present on the associated vehicle. More particularly, as shown in FIG. 3, the line fitting 36 provides for a right-angle type connection of the coolant line 32 atop the radiator 30, while the line fitting 38 provides for a right-angle type connection of another coolant line below the radiator 30. Hence, while one of the motorcycle's coolant lines (e.g., 32) can bring heated fluid into the radiator 30, another coolant line can dispel cooled fluid from the radiator 30. It should be appreciated that the radiator 30 might alternatively include more than two line fittings, such as for example when the radiator is configured to separately and simultaneously cool multiple fluids (e.g., engine oil and transmission fluid). Also, the line fittings can be associated with a radiator in any of a variety of alternative manners, orientations and/or locations upon the radiator.

The motorcycle 12 can also include right and left turn signal assemblies that are disposed near the forward end 60 of the motorcycle 12. In particular, FIG. 1 depicts a right turn signal assembly 42 that is associated with the radiator 30. FIGS. 2 and 3 further depict a left turn signal assembly 72 that is also associated with the radiator 30. The right turn signal assembly 42 is shown to include a housing 43 and a lens 44. The housing 43 can be constructed from any of a variety of materials including but not limited to plastics, metals, fiberglass, carbon fiber, and a host of other materials. The housing 43 can be adapted to be supported relative to the frame 13 in proximity to the radiator 30. In some embodiments, the housing 43 can be supported either directly or indirectly by the radiator 30. Direct support might involve attachment of the housing 43 to the radiator 30 (e.g., with bolts, adhesives, clips and/or another mechanical interface). Indirect support might involve attachment of the housing 43 to either a cowl or a scoop that at least partially surrounds the radiator 30. In other embodiments, the housing might actually provide or be integral with a cowl or scoop that at least partially surrounds a radiator. Although a cowl or scoop might only partially surround and/or cover the radiator, it should be appreciated that such a cowl or scoop might alternatively extend to additionally surround and/or cover other components of the motorcycle (e.g., an air filter, engine components, frame portions, etc.). A cowl can be used to cover one or more sharp or unattractive edges or corners of a radiator, for example. A scoop can be used to help steer or direct air into an associated radiator during vehicular movement and/or wind exposure. In still another embodiment, the housing might be integrally formed with the radiator itself.

An exemplary turn signal assembly can include at least one optic (e.g., a lens 44) that is operative to manipulate the illumination from an associated light source (discussed below) in order to assist in directing the illumination in a desired direction and/or at a desired intensity. For example, the lens 44 is an optic that can be formed from any of a variety of materials that are sufficiently translucent to facilitate the passage of light therethrough. More particularly, the lens 44 might be formed from translucent plastic and might be colored (e.g., amber) and/or provided (e.g., through etching, molding, or other forming) with a textured surface that is operative to diffuse or focus light. Such lenses can often be associated with a housing with adhesives, mechanical fasteners, plastic joining techniques (e.g., coextrusion, radio frequency welding), press fitting, and/or any of a variety of other available mechanical interface techniques. It should be appreciated, however, that a turn signal assembly in accordance with the teachings of the present invention might involve a lens that is integral with a light source (e.g., a portion of an LED might serve as a lens) and/or with a housing. As one example of a lens being provided integrally with a housing, the housing might be formed from a translucent material but might be partially painted, coated or otherwise surrounded with an opaque material such that light can only pass through the housing at selected locations (i.e.: these selected locations provide the lenses). In still other embodiments, an exemplary turn signal assembly might be provided with other optics (e.g., mirrors, reflective surfaces, reflectors) in addition to or in lieu of any lens(es). In certain other embodiments, however, the turn signal assembly might not include any optics whatsoever.

A light source can be associated with the housing 43 and can be adapted to generate a turn signal and/or hazard indication that can be seen by drivers of other vehicles, for example. An exemplary light source is depicted in FIG. 3 as comprising an LED (Light Emitting Diode) bar 80 formed from a plurality of aligned LEDs (e.g., 81). This LED bar 80 is shown to reside within the housing 43 and behind the lens 44. In the embodiment depicted in FIG. 3, light generated by the LED bar 80 passes through the lens 44 such that it may be visible to other vehicular operators. A reflector assembly 82 can be provided as an optic to help ensure that the light generated by the LEDs (e.g., 81) passes through the lens 44 at an appropriate angle and with an appropriate dispersion. The LED bar 80 is shown to receive electrical power from a power connection (e.g., a plug-type connector 86) that is connected to the LED bar 80 with a wire 84.

It should be appreciated that in other embodiments, the light source can comprise one or more incandescent light bulbs, LEDs, xenon tubes, discharge lamps, fluorescent bulbs, neon tubes, and/or any other suitable electrically powered light generating device(s). In still other embodiments, the light source might include an optical fiber element. In still further embodiments, the light source might comprise a shutter operative to selectively enable/disable viewing of a substantially permanently illuminated light source (e.g., a tritium-filled capsule) or a light reflecting device. In one exemplary embodiment of the present invention, the light source might include at least one incandescent lamp or at least one LED. In another embodiment, the light source can include a plurality of incandescent lamps or LEDs.

An exemplary turn signal assembly can also include a power connection that is associated with the housing and is adapted to receive power. This power can in some circumstances be received from a turn signal control circuit that can be remotely located on an associated vehicle, which in turn can receive its power from an associated battery and/or generator on that vehicle. The power connection can be coupled with the light source of an exemplary turn signal assembly and can provide power thereto in order that the light source can selectively provide illumination as a turn signal indication, for example. As shown in FIG. 3, the power connection of an exemplary turn signal assembly can comprise a plug-type connector 86 for receiving electrical power for transmission to the light source (e.g., LED bar 80). In other embodiments, a suitable power connection might alternatively comprise a wire, an inductive receiver, and/or any of a variety of other suitable devices or arrangements for receiving electrical or mechanical power to facilitate the selective emission of light from the associated turn signal assembly. In still another embodiment, the power connection might comprise an optical fiber for receiving light energy for transmission to the light source. It should also be appreciated that the power connection might be configured to receive other forms of power for use by the associated light source.

While a first turn signal assembly (e.g., 42) can be adapted to provide one of a pair of front turn signals for a vehicle (e.g., a motorcycle), a second turn signal assembly (e.g., 72) can be adapted to provide the other of the pair of front turn signals for that vehicle. More particularly, in the specific exemplary embodiment of FIGS. 2–3, the left turn signal assembly 72 is shown to include a housing 73 and a lens 74, and may include a similar light source as has been discussed with respect to the right turn signal assembly 42. While the right turn signal assembly 42 is shown in FIG. 2, for example, as being disposed on the right side 66 of the motorcycle 12 (e.g., near an operator's right foot), the left turn signal assembly 72 can be disposed upon the left side 64 of the motorcycle 12 (e.g., near an operator's left foot). In the particular embodiment depicted in FIGS. 1–3, the right and left turn signal assemblies 42, 72 are shown as being substantially similar to each other. However, it should be appreciated that in other embodiments of the present invention, a vehicle (e.g., motorcycle 12) can incorporate right and left turn signal assemblies that are not similar to each other. In any event, the discussion provided herein with respect to available alternate embodiments for a right turn signal assembly is equally applicable with respect to a left turn signal assembly.

In the particular embodiment of FIGS. 1–3, the right and left turn signal assemblies 42, 72 are shown to include housings 43, 73 that attach (e.g., with fasteners 40) to the right and left sides of the radiator 30, respectively. As the housings 43, 73 each conceal respective portions of the radiator's 30 outer perimeter, each of these housings 43, 73 provides a cowl for the radiator 30. In addition, as each of these housings 43, 73 protrudes outwardly in front of the radiator 30, each of these housings 43, 73 provides a scoop for directing air into the radiator 30. By associating the housings 43, 73 of the right and left turn signal assemblies 42, 72 with the radiator 30 in this manner, the right and left turn signal assemblies 42, 72 can be substantially integrated with the radiator 30 such that the turn signal assemblies 42, 72 do not detract from an associated motorcycle's functionality, durability or aesthetic appearance.

Figure 4:
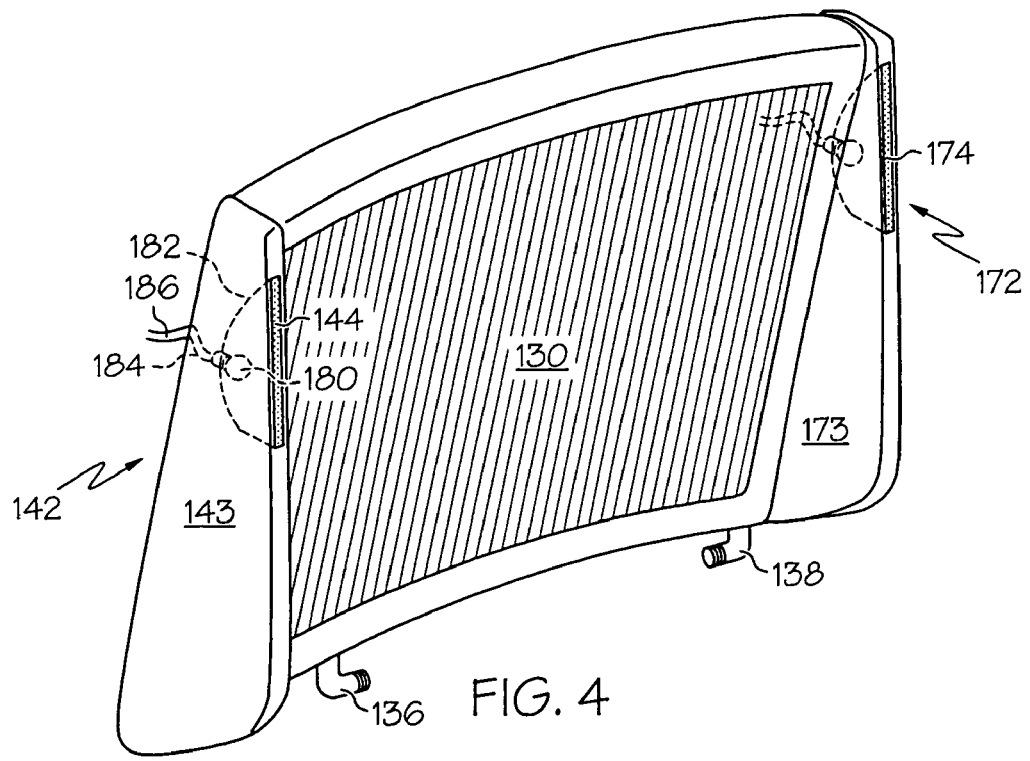
FIG. 4 is a front perspective view depicting a radiator and associated turn signal assemblies in accordance with another exemplary embodiment of the present invention.

FIG. 4 depicts an alternate exemplary embodiment of a radiator 130 with associated right and left turn signal assemblies 142, 172 in accordance with the teachings of the present invention. The radiator 130 is shown to include line fittings 136 and 138 disposed at the bottom of the radiator 130. In the embodiment depicted in FIG. 4, the right and left turn signal assemblies 142, 172 are shown to include housings 143, 173, respectively. The housings 143, 173 are shown to interface lenses 144, 174, respectively. As opposed to the lenses 44, 74 of FIG. 3 which are generally sloped downwardly, the lenses 144, 174 of FIG. 4 are generally sloped upwardly. Also, unlike the housing 43 of FIG. 3, the housing 143 of FIG. 4 is shown to fully cover the right side of the radiator 130. The housing 173 might similarly fully cover the left side of the radiator 130. Although no fasteners are depicted as attaching the housings 143, 173 to the radiator 130, it should be appreciated that any of a variety of mechanical interfaces can be employed to facilitate these attachments. For example, the housings 143, 173 can be glued to the radiator 130, can be bolted to the radiator 130, and/or can be snap-fit onto the radiator 130. As the housings 143, 173 each conceal respective portions of the radiator's 130 outer perimeter, each of these housings 143, 173 provides a cowl for the radiator 130. In addition, as each of these housings 143, 173 protrudes outwardly in front of the radiator 130, each of these housings 143, 173 provides a scoop for directing air into the radiator 130.

FIG. 4 also depicts a light source in association with the right turn signal assembly 142. More particularly, the light source is shown to include an incandescent light bulb 180 that is enshrouded within a reflector assembly 182 that assists in directing light from the bulb 180 to and through the associated lens 144. The light bulb 180 is shown to receive power through a wire 184 from a power connection comprising a cable 186. Although the wire 184 and cable 186 are depicted in FIG. 4 as being substantially integral and continuous, it should be appreciated that in some embodiments, the wire 184 might be provided separately from the cable 186, but may be connected therewith at a junction. It is contemplated that the left turn signal assembly 172 might include a similar light source and power connection arrangement, although many other suitable arrangements might alternatively be provided.

Figure 5:
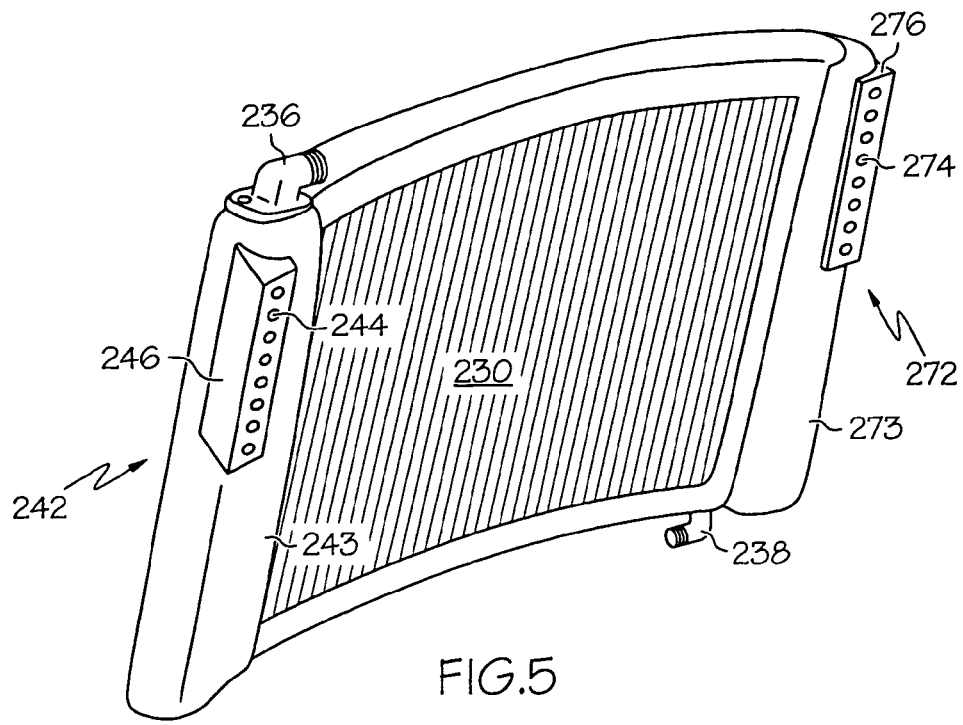
FIG. 5 is a front perspective view depicting a radiator and associated turn signal assemblies in accordance with yet another exemplary embodiment of the present invention.

FIG. 5 depicts another alternate exemplary embodiment of a radiator 230 with associated right and left turn signal assemblies 242, 272 in accordance with the teachings of the present invention. The radiator 230 is depicted as being provided with first and second line fittings 236, 238 that are adapted to connect to respective vehicular coolant lines. The right turn signal assembly 242 is shown to include a housing 243. The housing 243 can include a base 246 upon which one or more lenses (e.g., 244) can be disposed. In another embodiment, the base 246 might be configured to have openings (e.g., similar in size to lens 244) through which one or more light sources (e.g., LEDs) can protrude. Similarly, the left turn signal assembly 272 can include a base 276 upon which one or more lenses (e.g., 274) can be disposed or through which one or more light sources (e.g., LEDs) can protrude. In one embodiment of the present invention, the lenses (e.g., 244, 274) might be integral with one or more light sources (e.g., LEDs). As the housings 243, 273 each conceal respective portions of the radiator's 230 outer perimeter, each of these housings 243, 273 provides a cowl for the radiator 230. In addition, to the extent that each of these housings 243, 273 protrudes outwardly in front of the radiator 230, each of these housings 243, 273 provides a scoop for directing air into the radiator 230.

Figure 6:
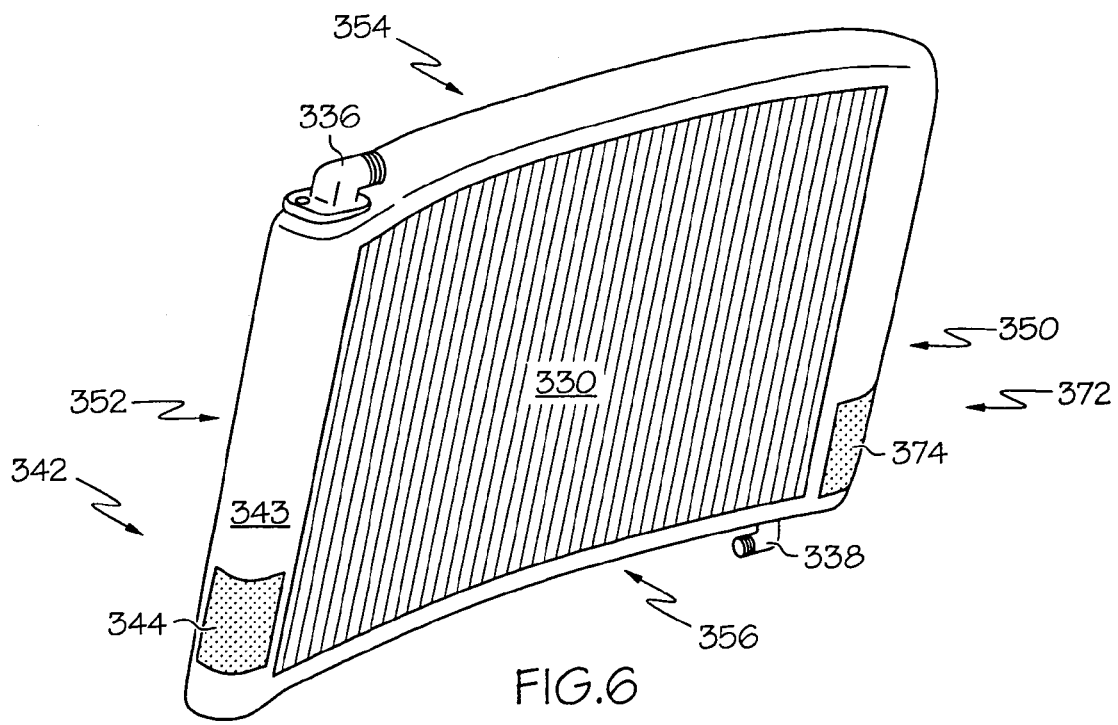
FIG. 6 is a front perspective view depicting a radiator and associated turn signal assemblies in accordance with still another exemplary embodiment of the present invention.

FIG. 6 depicts yet another alternate exemplary embodiment of a radiator 330 with associated right and left turn signal assemblies 342, 372 in accordance with the teachings of the present invention. The radiator 330 is provided with first and second line fittings 336 and 338 and is shown as being substantially and entirely surrounded by a single housing 343. The housing 343 is shown to include a first housing portion 350, a second housing portion 352, a third housing portion 354, and a fourth housing portion 356. The right turn signal assembly 342 includes the second housing portion 352 and a lens 344, and the left turn signal assembly 372 includes the first housing portion 350 and a lens 374. In this manner, the first housing portion 350 and the second housing portion 352 can both be integrally provided by the same housing 343. In other embodiments, however, the first housing portion and the second housing portion are provided by separate and distinct housings. In other words, separate and distinct housings can be provided for each of the right and left turn signal assemblies (e.g., as in FIG. 3).

The first housing portion 350 is shown to substantially cover the left side of the radiator 330, the second housing portion 352 is shown to substantially cover the right side of the radiator 330, the third housing portion 354 is shown to substantially cover the top side of the radiator 330 and the fourth housing portion 356 is shown to substantially cover the bottom side of the radiator 330. In this manner, the housing 343 can cover the outer edges of the radiator 330 (e.g., serving as a cowl) and thereby protects the edges of the radiator 330 from damage while improving the appearance and aerodynamics of the radiator 330. In addition, the housing 343 can protect an operator of an associated vehicle (e.g., a motorcycle) from contacting sharp edges associated with the radiator 330.

Figure 7:
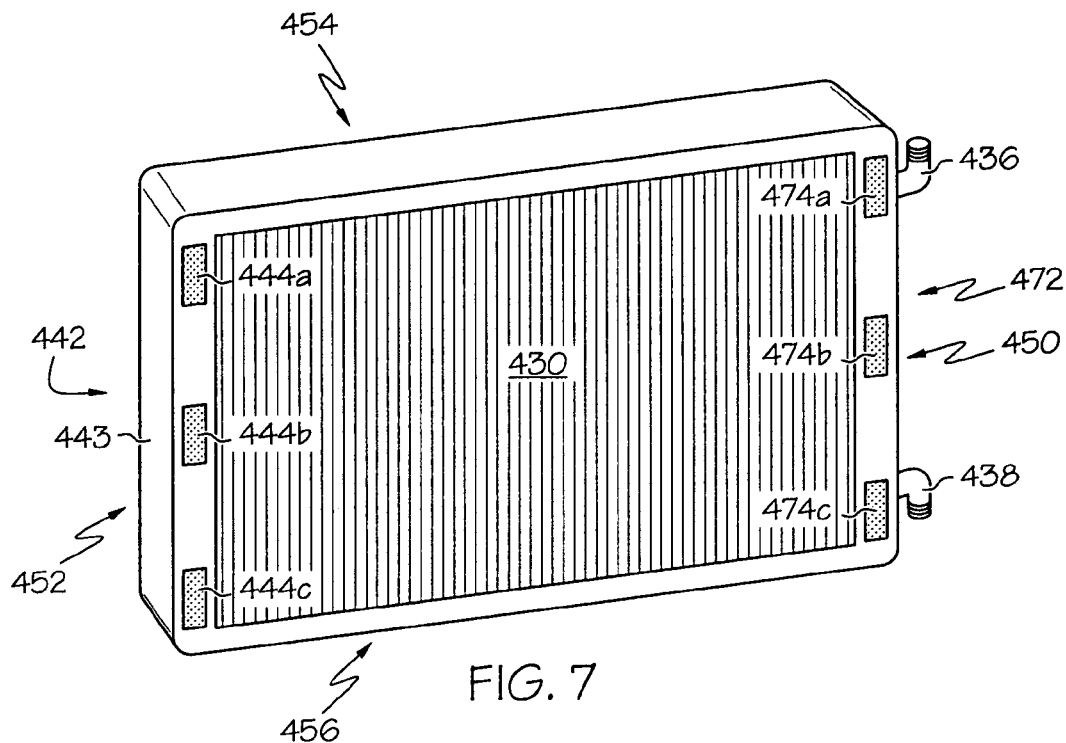
FIG. 7 is a front perspective view depicting a radiator and associated turn signal assemblies in accordance with yet another exemplary embodiment of the present invention.

FIG. 7 depicts still another alternate exemplary embodiment of a radiator 430 with associated right and left turn signal assemblies 442, 472 in accordance with the teachings of the present invention. The radiator 430 is provided with first and second line fittings 436 and 438 that are adapted to interface vehicular coolant lines, as discussed above. A single housing 443 can be provided to substantially surround and conceal the outer edges of the radiator 430 and to thereby serve as a cowl for the radiator 430. More particularly, the housing 443 is shown to include a first housing portion 450 for substantially covering the left side of the radiator 430, a second housing portion 452 for substantially covering the right side of the radiator 430, a third housing portion 454 for substantially covering the top side of the radiator 430, and a fourth housing portion 456 for substantially covering the bottom side of the radiator 430. In this manner, the housing 443 can protect an operator from contacting any sharp edges of the radiator 430 while improving the appearance and aerodynamics of the radiator 430. In one embodiment of the present invention (e.g., as shown in FIG. 7), each of the first housing portion 450, the second housing portion 452, the third housing portion 454 and the fourth housing portion 456 can be provided as one integral component. In other embodiments, however, one or more of these respective housing portions 450, 452, 454, 456 can be provided separately but can be associated with the other housing portions through use of fasteners, adhesives, and/or other mechanically interconnecting devices. In still further embodiments, an exemplary housing 443 might not include one or more of the housing portions 450, 452, 454, 456.

The right turn signal assembly 442 is shown to include lenses 444*a*, 444*b*, and 444*c*, all of which can be associated with the second housing portion 452 of the housing 443. Likewise, the left turn signal assembly 472 is shown to include lenses 474*a*, 474*b*, and 474*c*, all of which can be associated with the first housing portion 450 of the housing 443. It should of course be appreciated that an exemplary right turn signal assembly 442 and/or left turn signal assembly 472 can include fewer or greater than three lenses, and that these lenses can be associated with the housing 443 in any of a variety of specific manners as discussed above. Together, the right and left turn signal assemblies 442, 472 can be adapted to provide turn signal, marker, and/or hazard indication for recognition by operators of other vehicles.

In one embodiment of an exemplary right turn assembly 442, a single light source can provide illumination for each of the three lenses 444*a*, 444*b*, and 444*c*, whereby one or more reflectors or other optics associated with the housing 443 can assist in directing the illumination from the single light source to each lens 444*a*, 444*b*, 444*c*. In another embodiment, a separate light source might be associated with each of the three lenses 444*a*, 444*b*, and 444*c*. Although each of these three light sources might always be illuminated at the same time (i.e.: simultaneously), it should be appreciated that these three light sources might otherwise be illuminated in some alternating (e.g., sequential) pattern. Simultaneous illumination of one or more light sources of a turn signal assembly might simply involve power being repeatedly applied/removed to/from all (e.g., three) light sources simultaneously (e.g., to achieve a flashing pattern of a conventional turn signal), or can alternatively involve any of a variety of other available patterns. As an example of an alternating sequential pattern, a first light source might be provided with power such that light is emitted through the first lens 444*a*, a second light source might then be provided with power such that light is emitted through the second lens 444*b*, and a third light source might then be provided with power such that light is emitted through the third lens 444*c*, after which power can then be removed from all of the light sources simultaneously before the cycle again repeats itself. Any of a substantial variety of alternate sequential patterns might otherwise be implemented by a turn signal assembly having multiple light sources. Also, any of these light source configurations and/or flash patterns are also certainly applicable to the left turn signal assembly 472, wherein the left turn signal assembly of a given vehicle may or may not have a similar configuration and/or flash pattern as a right turn signal assembly of that same vehicle.

Figure 8:
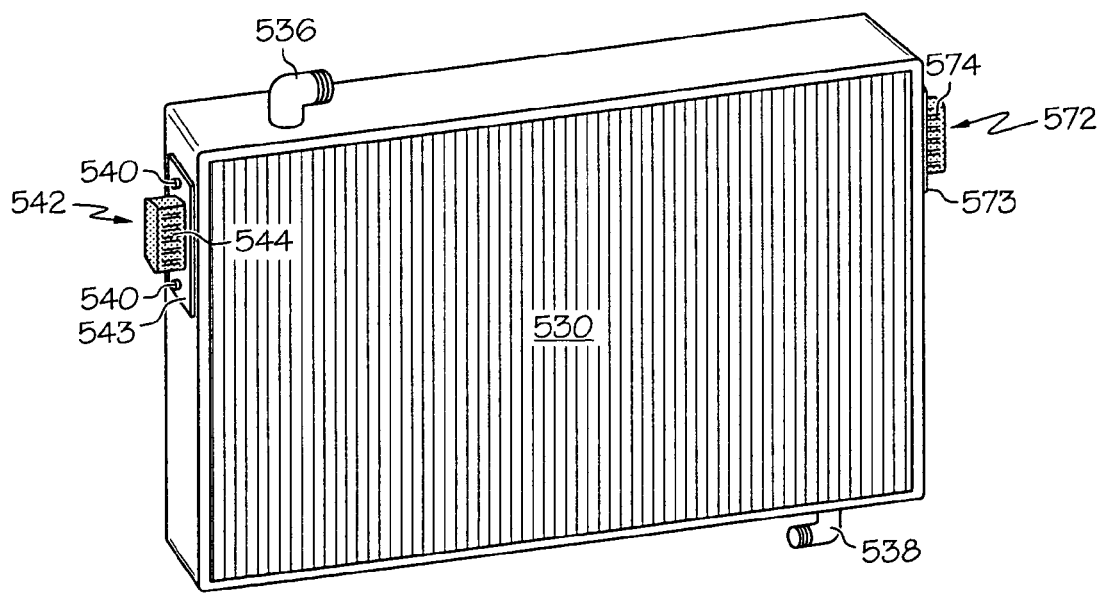
FIG. 8 is a front perspective view depicting a radiator and associated turn signal assemblies in accordance with another exemplary embodiment of the present invention.

FIG. 8 depicts another alternate exemplary embodiment of a radiator 530 with associated right and left turn signal assemblies 542, 572 in accordance with the teachings of the present invention. The radiator 530 is provided with line fittings 536 and 538 for interfacing vehicular coolant lines. No cowl or scoop is shown as being associated with the radiator 530 and the edges and corners of the radiator 530 resultantly remain substantially visible and available for contacting an operator. Nevertheless, the right turn signal assembly 542 includes a housing 543 that can be associated with the radiator 530 through use of fasteners (e.g., 540), adhesives, clips and/or some other mechanical interface. The housing 543 in this embodiment merely comprises a mounting base for a light source. A lens 544 can removably interface the housing 543 and can thereby conceal the light source between the lens 544 and the housing 543. The lens 543 might be formed from any of a variety of suitable materials, but in one embodiment might comprise amber-colored plastic that is generally translucent. As depicted in FIG. 8, the left turn signal assembly 572 is shown to include a similar housing 573 and lens 574 that are associated with the radiator 530 in a similar manner. In order to construct the embodiment of FIG. 8, it is conceivable that two standard running light assemblies (e.g., as can be purchased at any auto parts store) could be bolted, glued or welded to the sides of a radiator 530 in order to serve as a right turn signal assembly 542 and a left turn signal assembly 572. These standard running light assemblies typically involve a metal or plastic base (e.g., a housing 543, 573), a translucent lens (e.g., 544, 574), an LED or incandescent light source disposed between the base and lens, and a power connection (e.g., usually a wire). It should therefore be appreciated that a radiator having associated turn signal assemblies in accordance with the present invention can be provided very simply and inexpensively for vehicles such as a motorcycle, for example.

Many of the foregoing examples specifically disclose the use of an exemplary turn signal assembly in association with a motorcycle. It should, however, be appreciated that an exemplary turn signal assembly in accordance with the present invention can be associated with any of a variety of other vehicles having a radiator, including but not limited to automobiles, trucks, trailers, bicycles, aircraft, toys, and all terrain vehicles.

The foregoing description of exemplary embodiments and examples of the invention has been presented for purposes of illustration and description. It is not intended to be exhaustive or to limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. Rather, it is hereby intended that the scope of the invention be defined by the claims appended hereto.

What is claimed is:

1. A turn signal assembly for a motorcycle, the turn signal assembly comprising:
a housing adapted to be supported by a radiator of a motorcycle;
a power connection associated with the housing, the power connection being adapted to receive power;
a light source associated with the housing and coupled with the power connection, the light source being operative to selectively provide illumination as a turn signal indicia.

2. The turn signal assembly of claim 1 wherein the housing is adapted to be directly supported by a radiator of a motorcycle.

3. The turn signal assembly of claim 2 wherein the housing is attached to a radiator of a motorcycle.

4. The turn signal assembly of claim 1 wherein the housing is adapted to be indirectly supported by a radiator of a motorcycle.

5. The turn signal assembly of claim 4 wherein the housing is attached to a cowl that at least partially surrounds a radiator of a motorcycle.

6. The turn signal assembly of claim 4 wherein the housing is attached to a scoop that at least partially surrounds a radiator of a motorcycle.

7. The turn signal assembly of claim 1 wherein the housing provides a scoop that at least partially surrounds a radiator of a motorcycle.

8. The turn signal assembly of claim 1 wherein the housing provides a cowl that at least partially surrounds a radiator of a motorcycle.

9. The turn signal assembly of claim 1 wherein the housing comprises a mounting base for the light source.

10. The turn signal assembly of claim 1 being adapted to provide one of a pair of front turn signals for a motorcycle.

11. The turn signal assembly of claim 1 further comprising at least one optic being operative to manipulate the illumination from the light source.

12. The turn signal assembly of claim 1 wherein the light source comprises at least one incandescent lamp.

13. The turn signal assembly of claim 1 wherein the light source comprises at least one LED.

14. The turn signal assembly of claim 13 wherein the light source comprises a plurality of LED's.

15. A motorcycle comprising:
a frame;
a front wheel connected to the frame by a front fork;
a radiator disposed behind at least one of the front fork and the front wheel;
a first turn signal assembly being associated with the radiator and comprising:
a first housing portion adapted to be supported relative to the frame in proximity to the radiator;
a first power connection associated with the first housing portion, the first power connection being adapted to receive power; and
a first light source associated with the first housing portion and coupled with the first power connection, the first light source being operative to selectively provide illumination as a turn signal indicia.

16. The motorcycle of claim 15 wherein the first housing portion is adapted to be directly supported by the radiator.

17. The motorcycle of claim 16 wherein the first housing portion is attached to the radiator.

18. The motorcycle of claim 15 wherein the first housing portion is adapted to be indirectly supported by the radiator.

19. The motorcycle of claim 18 wherein the first housing portion is attached to a cowl that at least partially surrounds the radiator.

20. The motorcycle of claim 18 wherein the first housing portion is attached to a scoop that at least partially surrounds the radiator.

21. The motorcycle of claim 15 wherein the first housing portion provides a scoop that at least partially surrounds the radiator.

22. The motorcycle of claim 15 wherein the first housing portion provides a cowl that that at least partially surrounds the radiator.

23. The motorcycle of claim 15 wherein the first light source comprises an incandescent lamp.

24. The motorcycle of claim 15 wherein the first light source comprises an LED.

25. The motorcycle of claim 15 wherein the first turn signal assembly is adapted to provide one of a pair of front turn signals.

26. The motorcycle of claim 25 further comprising a second turn signal assembly being associated with the radiator and being adapted to provide the other of the pair of front turn signals.

27. The motorcycle of claim 26 wherein the second turn signal assembly comprises:
   a second housing portion adapted to be supported relative to the frame in proximity to the radiator;
   a second power connection associated with the second housing portion, the second power connection being adapted to receive power; and
   a second light source associated with the second housing portion and coupled with the second power connection, the second light source being operative to selectively provide illumination as a turn signal indicia.

28. The motorcycle of claim 27 wherein the first housing portion and the second housing portion are both integrally provided by the same housing.

29. The motorcycle of claim 27 wherein the first housing portion and the second housing portion are provided by separate and distinct housings.

30. A turn signal assembly for a vehicle, the turn signal assembly comprising:
   a housing adapted for association with a radiator of a vehicle;
   a power connection associated with the housing and adapted to receive electrical power; and
   a light source associated with the housing and coupled with the power connection, the light source being operative to convert the electrical power into illumination for providing a turn signal indicia, the light source comprising at least one of a light emitting diode and an incandescent light bulb.

31. A motorcycle comprising:
a frame;
a front wheel connected to the frame by a front fork;
a radiator disposed behind at least one of the front fork and the front wheel, the radiator having a left side and a right side;
a first turn signal assembly comprising:
   a first housing portion, the first housing portion being attached to the radiator adjacent to the left side of the radiator, the first housing portion covering at least a portion of the left side of the radiator;
   a first power connection associated with the first housing portion and adapted to receive electrical power; and
   a first light source associated with the first housing portion and coupled with the first power connection, the first light source being operative to convert the electrical power into illumination for providing a left turn signal indication, the first light source comprising at least one of a light emitting diode and an incandescent light bulb;
a second turn signal assembly comprising:
   a second housing portion being attached to the radiator adjacent to the right side of the radiator, the second housing portion covering at least a portion of the right side of the radiator;
   a second power connection associated with the second housing portion and adapted to receive electrical power; and
   a second light source associated with the second housing portion and coupled with the second power connection, the second light source being operative to convert the electrical power into illumination for providing a right turn signal indication, the second light source comprising at least one of a light emitting diode and an incandescent light bulb.

* * * * *